United States Patent
Lu et al.

(10) Patent No.: US 8,785,070 B2
(45) Date of Patent: Jul. 22, 2014

(54) DIRECT OXIDATION FUEL CELLS WITH IMPROVED CATHODE GAS DIFFUSION MEDIA FOR LOW AIR STOICHIOMETRY OPERATION

(75) Inventors: Guoqiang Lu, Latham, NY (US); Chao-Yang Wang, State College, PA (US); Takashi Akiyama, Osaka (JP)

(73) Assignee: Panasonic Corporation, Osaka (JP)

(*) Notice: Subject to any disclaimer, the term of this patent is extended or adjusted under 35 U.S.C. 154(b) by 1168 days.

(21) Appl. No.: 12/722,081

(22) Filed: Mar. 11, 2010

(65) Prior Publication Data

US 2010/0183951 A1  Jul. 22, 2010

Related U.S. Application Data

(62) Division of application No. 11/655,867, filed on Jan. 22, 2007, now Pat. No. 7,704,629.

(51) Int. Cl.
H01M 8/24 (2006.01)
H01M 8/00 (2006.01)

(52) U.S. Cl.
USPC ........... 429/444; 429/400; 429/428; 429/443; 429/535

(58) Field of Classification Search
USPC .................................. 429/400–535
See application file for complete search history.

(56) References Cited

U.S. PATENT DOCUMENTS

| 5,599,638 | A | 2/1997 | Surampudi et al. |
| 2002/0146616 | A1 | 10/2002 | Yasuo et al. |
| 2004/0121122 | A1 | 6/2004 | Reynolds, III et al. |
| 2004/0209136 | A1* | 10/2004 | Ren et al. ........................ 429/30 |
| 2005/0170237 | A1* | 8/2005 | Nakagawa et al. ............. 429/44 |
| 2005/0287418 | A1 | 12/2005 | Noh et al. |
| 2006/0141338 | A1* | 6/2006 | Wang et al. ..................... 429/44 |
| 2006/0177727 | A1 | 8/2006 | Ruth et al. |
| 2007/0020491 | A1* | 1/2007 | Ogburn ........................... 429/13 |

FOREIGN PATENT DOCUMENTS

| EP | 1 289 036 A1 | 3/2003 |
| EP | 1775788 A1 | 4/2007 |
| WO | WO 02/056404 A1 | 7/2002 |
| WO | WO 2005/124903 A1 | 12/2005 |
| WO | WO 2007/081443 | 7/2007 |

OTHER PUBLICATIONS

United States Office Action issued in U.S. Appl. No. 13/480,114 dated Aug. 2, 2012.
U.S. Appl. No. 11/020,306, filed Jun. 29, 2006, Wang et al.
U.S. Appl. No. 11/242,944, Wang et al.
Pasaogullari, Ugur and Wang, C.Y.; "Liquid Water Transport in Gas Diffusion Layer of Polymer Electrolyte Fuel Cells"; Jouornal of the electrochemical Society, 151 (3) A399-A406 (2004).
International preliminary Report on Patentability and Written Opinion of the International Searching Authority, issued in corresponding PCT/ US2007/025591, dated on Jul. 10, 2008.

* cited by examiner

*Primary Examiner* — Muhammad Siddiquee
(74) *Attorney, Agent, or Firm* — McDermott Will & Emery LLP

(57) ABSTRACT

A cathode for use in a direct oxidation fuel cell (DOFC) comprises a gas diffusion medium (GDM) including a backing layer and a microporous layer comprising a fluoropolymer and an electrically conductive material, wherein loading of the fluoropolymer in the microporous layer is in the range from about 10 to about 60 wt. %. In use, a concentrated solution of a liquid fuel is supplied to an anode and an oxidant to the cathode of the fuel cell, and the fuel cell may be operated at a low oxidant stoichiometry $\xi_c$ not greater than about 2.5.

13 Claims, 2 Drawing Sheets

DIRECT OXIDATION FUEL CELLS WITH IMPROVED CATHODE GAS DIFFUSION MEDIA FOR LOW AIR STOICHIOMETRY OPERATION

RELATED APPLICATIONS

This application is a Divisional of U.S. patent application Ser. No. 11/655,867, filed on Jan. 22, 2007 now U.S. Pat. No. 7,704,629, the disclosure of which Application is incorporated by reference herein.

FIELD OF THE DISCLOSURE

The present disclosure relates generally to fuel cells, fuel cell systems, and electrodes/electrode assemblies for same. More specifically, the present disclosure relates to cathodes with improved gas diffusion media, suitable for direct oxidation fuel cells (hereinafter "DOFC"), such as direct methanol fuel cells (hereinafter "DMFC"), and their fabrication methods.

BACKGROUND OF THE DISCLOSURE

A DOFC is an electrochemical device that generates electricity from electrochemical oxidation of a liquid fuel. DOFC's do not require a preliminary fuel processing stage; hence, they offer considerable weight and space advantages over indirect fuel cells, i.e., cells requiring preliminary fuel processing. Liquid fuels of interest for use in DOFC's include methanol, formic acid, dimethyl ether, etc., and their aqueous solutions. The oxidant may be substantially pure oxygen or a dilute stream of oxygen, such as that in air. Significant advantages of employing a DOFC in portable and mobile applications (e.g., notebook computers, mobile phones, personal data assistants, etc.) include easy storage/handling and high energy density of the liquid fuel.

One example of a DOFC system is a DMFC. A DMFC generally employs a membrane-electrode assembly (hereinafter "MEA") having an anode, a cathode, and a proton-conducting membrane electrolyte positioned therebetween. A typical example of a membrane electrolyte is one composed of a perfluorosulfonic acid—tetrafluoroethylene copolymer, such as Nafion® (Nafion® a registered trademark of E.I. Dupont de Nemours and Company). In a DMFC, a methanol/water solution is directly supplied to the anode as the fuel and air is supplied to the cathode as the oxidant. At the anode, the methanol reacts with water in the presence of a catalyst, typically a Pt or Ru metal-based catalyst, to produce carbon dioxide, H$^+$ ions (protons), and electrons. The electrochemical reaction is shown as equation (1) below:

$$CH_3OH + H_2O \rightarrow CO_2 + 6H^+ + 6e^- \qquad (1)$$

During operation of the DMFC, the protons migrate to the cathode through the proton-conducting membrane electrolyte, which is non-conductive to electrons. The electrons travel to the cathode through an external circuit for delivery of electrical power to a load device. At the cathode, the protons, electrons, and oxygen molecules, typically derived from air, are combined to form water. The electrochemical reaction is given in equation (2) below:

$$3/2 O_2 + 6H^+ + 6e^- \rightarrow 3H_2O \qquad (2)$$

Electrochemical reactions (1) and (2) form an overall cell reaction as shown in equation (3) below:

$$CH_3OH + 3/2 O_2 \rightarrow CO_2 + 2H_2O \qquad (3)$$

One drawback of a conventional DMFC is that the methanol partly permeates the membrane electrolyte from the anode to the cathode, such permeated methanol being termed "crossover methanol". The crossover methanol chemically (i.e., not electrochemically) reacts with oxygen at the cathode, causing a reduction in fuel utilization efficiency and cathode potential, with a corresponding reduction in power generation of the fuel cell. It is thus conventional for DMFC systems to use excessively dilute (3-6% by vol.) methanol solutions for the anode reaction in order to limit methanol crossover and its detrimental consequences. However, the problem with such a DMFC system is that it requires a significant amount of water to be carried in a portable system, thus diminishing the system energy density.

The ability to use highly concentrated fuel is desirable for portable power sources, particularly since DMFC technology is currently competing with advanced batteries, such as those based upon lithium-ion technology. However, even if the fuel cartridge with highly concentrated fuel (e.g., pure or "neat" methanol) carries little to no water, the anodic reaction, i.e., equation (1), still requires one water molecule for each methanol molecule for complete electro-oxidation. Simultaneously, water is produced at the cathode via reduction of oxygen, i.e., equation (2). Therefore, in order to take full advantage of a fuel cell employing highly concentrated fuel, it is considered desirable to: (a) maintain a net water balance in the cell where the total water loss from the cell (mainly through the cathode) preferably does not exceed the net production of water (i.e., two water molecules per each methanol molecule consumed according to equation (3)), and (b) transport some of the produced water from the cathode to anode.

Two approaches have been developed to meet the above-mentioned goals in order to directly use concentrated fuel. A first approach is an active water condensing and pumping system to recover cathode water vapor and return it to the anode (U.S. Pat. No. 5,599,638). While this method achieves the goal of carrying concentrated (and even neat) methanol in the fuel cartridge, it suffers from a significant increase in system volume and parasitic power loss due to the need for a bulky condenser and its cooling/pumping accessories.

The second approach is a passive water return technique in which hydraulic pressure at the cathode is generated by including a highly hydrophobic microporous layer (hereinafter "MPL") in the cathode, and this pressure is utilized for driving water from the cathode to the anode through a thin membrane (Ren et al. and Pasaogullari & Wang, *J. Electrochem. Soc.*, pp A399-A406, March 2004). While this passive approach is efficient and does not incur parasitic power loss, the amount of water returned, and hence the concentration of methanol fuel, depends strongly on the cell temperature and power density. Presently, direct use of neat methanol is demonstrated at or below 40° C. and at low power density (less than 30 mW/cm$^2$). Considerably less concentrated methanol fuel is utilized in high power density (e.g., 60 mW/cm$^2$) systems at elevated temperatures, such as 60° C. In addition, the requirement for thin membranes in this method sacrifices fuel efficiency and operating cell voltage, thus resulting in lower total energy efficiency.

In order to utilize highly concentrated fuel with DOFC systems, such as DMFC systems described above, it is preferable to reduce the oxidant stoichiometry ratio, i.e., flow of oxidant (air) to the cathode for reaction according to equation (2) above. In turn, operation of the cathode must be optimized so that liquid product(s), e.g., water, formed on or in the vicinity of the cathode can be removed therefrom without resulting in substantial flooding of the cathode.

Accordingly, there is a prevailing need for DOFC/DMFC systems that maintain a balance of water in the fuel cell and return a sufficient amount of water from the cathode to the anode when operated with highly concentrated fuel and low oxidant stoichiometry ratio, i.e., less than about 8. There is an additional need for DOFC/DMFC systems that operate with highly concentrated fuel, including neat methanol, and minimize the need for external water supplies or condensation of electrochemically produced water.

In view of the foregoing, there exists a need for improved DOFC/DMFC systems and methodologies, including electrodes and gas diffusion media, which facilitate operation of such systems for obtaining optimal performance with very highly concentrated fuel and high power efficiency.

SUMMARY OF THE DISCLOSURE

An advantage of the present disclosure is improved gas diffusion media (GDM's) for use in cathode electrodes of fuel cells.

Another advantage of the present disclosure is improved cathode electrodes suitable for use in fuel cells, comprising improved GDM's.

Still another advantage of the present disclosure is improved direct oxidation fuel cells (DOFC's).

Yet another advantage is improved methods of operating direct oxidation fuel cells (DOFC's).

Additional advantages and features of the present disclosure will be set forth in the disclosure which follows and in part will become apparent to those having ordinary skill in the art upon examination of the following or may be learned from the practice of the present disclosure. The advantages may be realized and obtained as particularly pointed out in the appended claims.

According to an aspect of the present disclosure, the foregoing and other advantages are achieved in part by a cathode electrode for use in a direct oxidation fuel cell (DOFC), comprising an improved gas diffusion medium (GDM) including a backing layer and a microporous layer, the microporous layer comprising a fluoropolymer and an electrically conductive material, wherein loading of the fluoropolymer in the microporous layer is in the range from about 10 to about 60 wt. %.

According to preferred embodiments of the present disclosure, the fluoropolymer comprises poly(tetrafluoroethylene) (PTFE); the electrically conductive material comprises carbon particles or nanofibers, loading of the carbon particles or nanofibers in the microporous layer being in the range from about 0.5 to about 5 mg/cm$^2$, the microporous layer having a thickness ranging from about 10 to about 50 μm and an average pore size between about 10 and about 500 nm; and the backing layer comprises carbon paper or woven or non-woven cloth having a porosity greater than about 70% and fluoropolymer loading in the range from about 5 to about 30 wt. %.

Further preferred embodiments of the present disclosure include those wherein the cathode further comprises a catalyst layer and a hydrophobic microporous layer (MPL), the catalyst layer, hydrophobic MPL, and GDM being arranged in overlying sequence in the recited order.

Another aspect of the present disclosure is a direct oxidation fuel cell (DOFC) comprising the above-described cathode.

Yet another aspect of the present disclosure is a method of operating a direct oxidation fuel cell (DOFC) system, comprising steps of:

a) providing at least one fuel cell assembly including a cathode and an anode with an electrolyte positioned therebetween, the cathode comprising an improved gas diffusion medium (GDM) including a backing layer and a microporous layer, the microporous layer comprising an electrically conductive material and a fluoropolymer, loading of the fluoropolymer in the microporous layer being in the range from about 10 to about 60 wt. %;

b) supplying a concentrated solution of a liquid fuel to the anode and an oxidant to the cathode; and c) operating the at least one fuel cell assembly at a low oxidant stoichiometry not greater than about 4.

In accordance with preferred embodiments of the present disclosure, step (a) comprises providing at least one fuel cell assembly wherein the fluoropolymer comprises poly(tetrafluoroethylene) (PTFE); the electrically conductive material comprises carbon particles or nanofibers, loading of the carbon particles in the microporous layer being in the range from about 0.5 to about 5 mg/cm$^2$, the microporous layer having a thickness ranging from about 10 to about 50 μm and an average pore size between about 10 and about 500 nm; and the backing layer comprises carbon paper or woven or non-woven cloth having a porosity greater than about 70% and fluoropolymer loading in the range from about 5 to about 30 wt. %.

Further preferred embodiments of the present disclosure include those wherein step (a) comprises providing at least one fuel cell assembly wherein the cathode further comprises a catalyst layer and a hydrophobic microporous layer (MPL), the catalyst layer, hydrophobic MPL, and GDM are arranged in overlying sequence in the recited order; step (b) comprises providing a 20M solution of methanol (CH$_3$OH) to the anode and air to the cathode; and step (c) comprises operating the at least one fuel cell assembly at a low oxidant stoichiometry $\xi_c$ not greater than about 2.5, a steady-state power density not less than about 70 mW/cm$^2$, and a temperature of about 60° C.

Additional advantages of the present disclosure will become readily apparent to those skilled in this art from the following detailed description, wherein only the preferred embodiments of the present disclosure are shown and described, simply by way of illustration but not limitation. As will be realized, the disclosure is capable of other and different embodiments, and its several details are capable of modification in various obvious respects, all without departing from the spirit of the present invention. Accordingly, the drawings and description are to be regarded as illustrative in nature, and not as restrictive.

BRIEF DESCRIPTION OF THE DRAWING

The various features and advantages of the present disclosure will become more apparent and facilitated by reference to the accompanying drawings, provided for purposes of illustration only and not to limit the scope of the invention, wherein the same reference numerals are employed throughout for designating like features and the various features are not necessarily drawn to scale but rather are drawn as to best illustrate the pertinent features, wherein.

DETAILED DESCRIPTION OF THE DISCLOSURE

The present disclosure relates to fuel cells and fuel cell systems with high power conversion efficiency, such as DOFC's and DOFC systems operating with highly concentrated fuel, e.g., DMFC's and DMFC systems fueled with about 5 to about 25 M methanol ($CH_3OH$), and electrodes/electrode assemblies therefor.

Figure 1:
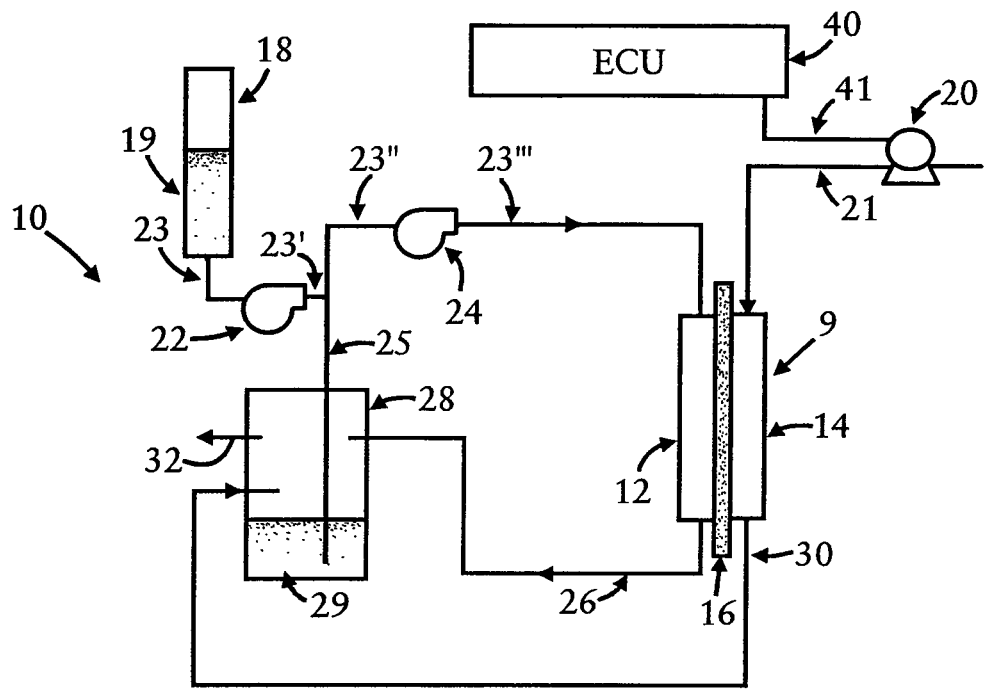
FIG. 1 is a simplified, schematic illustration of a DOFC system capable of operating with highly concentrated methanol fuel, i.e., a DMFC system.

Referring to FIG. 1, schematically shown therein is an illustrative embodiment of a DOFC system adapted for operating with highly concentrated fuel, e.g., a DMFC system 10, which system maintains a balance of water in the fuel cell and returns a sufficient amount of water from the cathode to the anode under high-power and elevated temperature operating conditions. (A DOFC/DMFC system is disclosed in co-pending, commonly assigned U.S. patent application Ser. No. 11/020,306, filed Dec. 27, 2004).

As shown in FIG. 1, DMFC system 10 includes an anode 12, a cathode 14, and a proton-conducting electrolyte membrane 16, forming a multi-layered composite membrane-electrode assembly or structure 9 commonly referred to as an MEA. Typically, a fuel cell system such as DMFC system 10 will have a plurality of such MEA's in the form of a stack; however, FIG. 1 shows only a single MEA 9 for illustrative simplicity. Frequently, the MEA's 9 are separated by bipolar plates that have serpentine channels for supplying and returning fuel and by-products to and from the assemblies (not shown for illustrative convenience). In a fuel cell stack, MEAs and bipolar plates are aligned in alternating layers to form a stack of cells and the ends of the stack are sandwiched with current collector plates and electrical insulation plates, and the entire unit is secured with fastening structures. Also not shown in FIG. 1, for illustrative simplicity, is a load circuit electrically connected to the anode 12 and cathode 14.

A source of fuel, e.g., a fuel container or cartridge 18 containing a highly concentrated fuel 19 (e.g., methanol), is in fluid communication with anode 12 (as explained below). An oxidant, e.g., air supplied by fan 20 and associated conduit 21, is in fluid communication with cathode 14. The highly concentrated fuel from fuel cartridge 18 is fed directly into liquid/gas (hereinafter "L/G") separator 28 by pump 22 via associated conduit segments 23' and 25, or directly to anode 12 via pumps 22 and 24 and associated conduit segments 23, 23', 23'', and 23'''.

In operation, highly concentrated fuel 19 is introduced to the anode side of the MEA 9, or in the case of a cell stack, to an inlet manifold of an anode separator of the stack. Water produced at the cathode 14 side of MEA 9 or cathode cell stack via electrochemical reaction (as expressed by equation (2)) is withdrawn therefrom via cathode outlet or exit port/conduit 30 and supplied to liquid/gas separator 28. Similarly, excess fuel, water, and carbon dioxide gas are withdrawn from the anode side of the MEA 9 or anode cell stack via anode outlet or exit port/conduit 26 and supplied to L/G separator 28. The air or oxygen is introduced to the cathode side of the MEA 9 and regulated to maximize the amount of electrochemically produced water in liquid form while minimizing the amount of electrochemically produced water vapor, thereby minimizing the escape of water vapor from system 10.

During operation of system 10, air is introduced to the cathode 14 (as explained above) and excess air and liquid water are withdrawn therefrom via cathode exit port/conduit 30 and supplied to L/G separator 28. As discussed further below, the input air flow rate or air stoichiometry is controlled to maximize the amount of the liquid phase of the electrochemically produced water while minimizing the amount of the vapor phase of the electrochemically produced water. Control of the oxidant stoichiometry ratio can be obtained by setting the speed of fan 20 at a rate depending on the fuel cell system operating conditions or by an electronic control unit (hereinafter "ECU") 40, e.g., a digital computer-based controller or equivalently performing structure. ECU 40 receives an input signal from a temperature sensor in contact with the liquid phase 29 of L/G separator 28 (not shown in the drawing for illustrative simplicity) and adjusts the oxidant stoichiometric ratio (via line 41 connected to oxidant supply fan 20) so as to maximize the liquid water phase in the cathode exhaust and minimize the water vapor phase in the exhaust, thereby reducing or obviating the need for a water condenser to condense water vapor produced and exhausted from the cathode of the MEA 2. In addition, ECU 40 can increase the oxidant stoichiometry beyond the minimum setting during cold-start in order to avoid excessive water accumulation in the fuel cell.

Liquid water 29 which accumulates in the L/G separator 28 during operation may be returned to anode 12 via circulating pump 24 and conduit segments 25, 23'', and 23'''. Exhaust carbon dioxide gas is released through port 32 of L/G separator 28.

As indicated above, cathode exhaust water, i.e., water which is electrochemically produced at the cathode during operation, is partitioned into liquid and gas phases, and the relative amounts of water in each phase are controlled mainly by temperature and air flow rate. The amount of liquid water can be maximized and the amount of water vapor minimized by using a sufficiently small oxidant flow rate or oxidant stoichiometry. As a consequence, liquid water from the cathode exhaust can be automatically trapped within the system, i.e., an external condenser is not required, and the liquid water can be combined in sufficient quantity with a highly concentrated fuel, e.g., greater than about 5 molar, for use in performing the anodic electrochemical reaction, thereby maximizing the concentration of fuel and storage capacity and minimizing the overall size of the system. The water can be recovered in any suitable existing type of L/G separator 28, e.g., such as those typically used to separate carbon dioxide gas and aqueous methanol solution.

The DOFC/DMFC system 10 shown in FIG. 1 comprises at least one MEA 9 which includes a polymer electrolyte membrane 16 and a pair of electrodes (an anode 12 and a cathode 14) each composed of a catalyst layer and a gas diffusion layer sandwiching the membrane. Typical polymer electrolyte materials include fluorinated polymers having perfluorosulfonate groups or hydrocarbon polymers such as poly-(arylene ether ether ketone) (hereinafter "PEEK"). The electrolyte membrane can be of any thickness as, for example, between about 25 and about 180 μm. The catalyst layer typically comprises platinum or ruthenium based metals, or alloys thereof. The anodes and cathodes are typically sandwiched by bipolar separator plates having channels to supply fuel to the anode and an oxidant to the cathode. A fuel cell stack can contain a plurality of such MEA's 9 with at least one electrically conductive separator placed between adjacent MEA's to electrically connect the MEA's in series with each other, and to provide mechanical support.

As has been indicated above, ECU 40 can adjust the oxidant flow rate or stoichiometric ratio so as to maximize the liquid water phase in the cathode exhaust and minimize the water vapor phase in the exhaust, thereby eliminating the need for a water condenser. ECU 40 adjusts the oxidant flow rate, and hence the stoichiometric ratio, according to equation (4) given below:

$$\xi_c = \frac{0.42(\gamma+2)}{3\eta_{fuel}} \frac{p}{p_{sat}} \quad (4)$$

wherein $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency, defined as the ratio of the operating current density, I, to the sum of the operating current density and the equivalent fuel (e.g., methanol) crossover current density, $I_{xover}$, as expressed by equation (5) below:

$$\eta_{fuel} = \frac{I}{I+I_{xover}} \quad (5)$$

Such controlled oxidant stoichiometry automatically ensures an appropriate water balance in the DMFC (i.e. enough water for the anode reaction) under any operating conditions. For instance, during start-up of a DMFC system, when the cell temperature increases from e.g., 20° C. to the operating point of 60° C., the corresponding $p_{sat}$ is initially low, and hence a large oxidant stoichiometry (flow rate) should be used in order to avoid excessive water accumulation in the system and therefore cell flooding by liquid water. As the cell temperature increases, the oxidant stoichiometry (e.g., air flow rate) can be reduced according to equation (4).

In the above, it is assumed, though not required, that the amount of liquid (e.g., water) produced by electrochemical reaction in MEA 9 and supplied to L/G separator 28 is essentially constant, whereby the amount of liquid product returned to the inlet of anode 12 via pump 24 and conduit segments 25, 23", and 23'" is essentially constant, and is mixed with concentrated liquid fuel 19 from fuel container or cartridge 18 in an appropriate ratio for supplying anode 12 with fuel at an ideal concentration.

Figure 2:
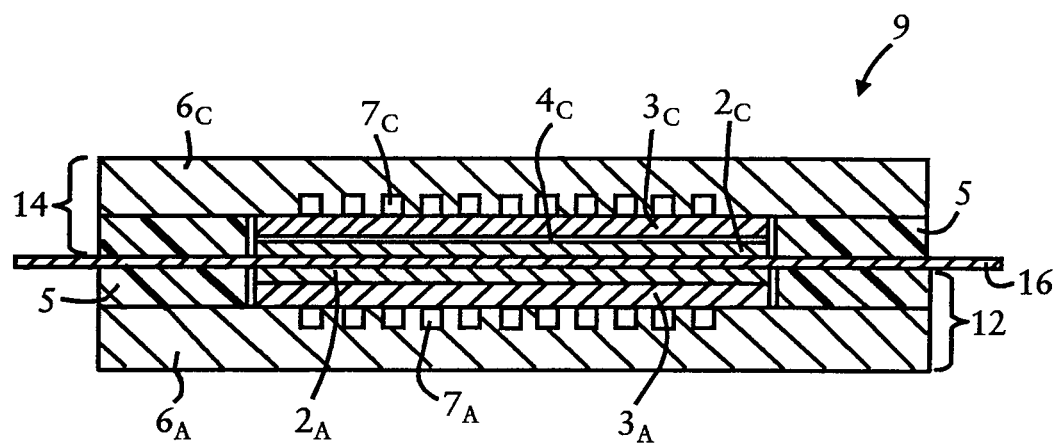
FIG. 2 is a schematic, cross-sectional view of a representative configuration of a membrane electrode assembly suitable for use in a fuel cell/fuel cell system such as the DOFC/DMFC system of FIG. 1.

Referring now to FIG. 2, shown therein is a schematic, cross-sectional view of a representative configuration of a MEA 9 for illustrating its various constituent elements in more detail. As illustrated, a cathode electrode 14 and an anode electrode 12 sandwich a polymer electrolyte membrane 16 made of a material, such as described above, adapted for transporting hydrogen ions from the anode to the cathode during operation. The anode electrode 12 comprises, in order from electrolyte membrane 16, a metal-based catalyst layer $2_A$ in contact therewith, and an overlying gas diffusion layer (GDL) $3_A$, whereas the cathode electrode 14 comprises, in order from electrolyte membrane 16: (1) a metal-based catalyst layer $2_C$ in contact therewith; (2) an intermediate, hydrophobic micro-porous layer (MPL) $4_C$; and (3) an overlying gas diffusion medium (GDM) $3_C$. GDL $3_A$ and GDM $3_C$ are each gas permeable and electrically conductive, and may be comprised of a porous carbon-based material including a carbon powder and a fluorinated resin, with a support made of a material such as, for example, carbon paper or woven or non-woven cloth, felt, etc. Metal-based catalyst layers $2_A$ and $2_C$ may, for example, comprise Pt or Ru.

Figure 3:
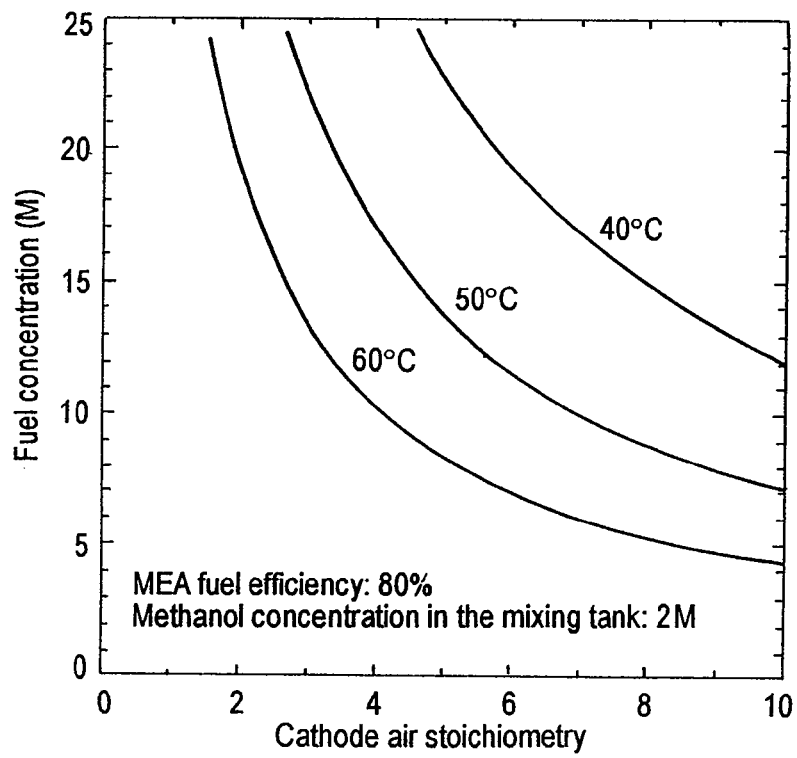
FIG. 3 is a graph for illustrating the dependence of allowable fuel concentration as a function of cathode air stoichiometry for various system operating temperatures.

As graphically shown in FIG. 3, the allowable fuel concentrations of DOFC's such as DMFC's significantly depend upon the cathode air stoichiometry. As may be evident from FIG. 3, an efficient way of utilizing a highly concentrated solution of fuel (methanol) in the fuel reservoir or cartridge of the DMFC is to reduce the cathode air stoichiometry for fixed temperature operation of the DMFC. More specifically, in order to increase the concentration of the fuel stored in fuel cartridge 18, it is preferable that the oxidant stoichiometry ratio (flow rate), $\xi_c$, be reduced to less than about 8, preferably less than about 4, more preferably not greater than about 2.5. As a consequence, the cathode electrode must be optimized with respect to liquid product (e.g., water) removal therefrom so as to prevent flooding during operation at such low oxidant stoichiometery ratios (flow rates). This is accomplished by means of hydrophobic MPL $4_C$ interposed between catalyst layer $2_C$ and GDM $3_C$.

Completing MEA 9 are respective electrically conductive anode and cathode separators $6_A$ and $6_C$ for mechanically securing the anode 12 and cathode 14 electrodes against polymer electrolyte membrane 16. As illustrated, each of the anode and cathode separators $6_A$ and $6_C$ includes respective channels $7_A$ and $7_C$ for supplying reactants to the anode and cathode electrodes and for removing excess reactants and liquid and gaseous products formed by the electrochemical reactions. Lastly, MEA 9 is provided with gaskets 5 around the edges of the cathode and anode electrodes for preventing leaking of fuel and oxidant to the exterior of the assembly. Gaskets 5 are typically made of an O-ring, a rubber sheet, or a composite sheet comprised of elastomeric and rigid polymer materials.

Desirable characteristics of hydrophobic MPL $4_C$ for ensuring adequate removal of liquid product (e.g., water in the case of DMFC cells) from the cathode electrode of MEA 9 in order to minimize flooding during operation at low oxidant stoichiometry ratios (flow rates) include:

1. sufficient electrical conductivity;
2. highly hydrophobic characteristics for water repellency; and
3. sufficient porosity for good gas permeability.

Typically, MPL $4_C$ is optimized for liquid product (water) removal by use of a composite material formed of a carbon black and PTFE, with a layer thickness of about 10-50 μm and an average pore size between 10 and 500 nm. The carbon black (e.g., Vulcan XC72R) provides the composite material with electrical conductivity and porous structure, and the PTFE provides the composite material with highly hydrophobic characteristics.

Further improvement of the properties of the cathode gas diffusion medium (GDM) $3_C$ is considered desirable and necessary for facilitating operation at low oxidant stoichiometries, i.e., at low air flow rates, to thereby enable use of highly concentrated fuel (methanol) in the above described DOFC/DMFC systems.

The cathode gas diffusion medium (GDM) $3_C$ typically includes a backing layer and a microporous layer, with a carbon paper or woven or non-woven cloth constituting the backing layer. Functions of the cathode GDM $3_C$ include: providing a path for oxygen ($O_2$) transport to the cathode catalyst layer $2_C$, collecting current, and removing water from the cathode electrode thereby to prevent flooding. Preferably, the carbon paper or woven or non-woven cloth constituting the backing layer has a porosity greater than about 70% and fluoropolymer loading in the range from about 5 to about 30 wt. %.

As indicated above, in order to improve the performance of DOFC's/DMFC's operating at low oxidant (air) stoichiometries, it is necessary to improve the cathode GDM $3_C$. The key to obtaining such improvement lies in the choice of material of the backing layer and constitution of the microporous layer. Significant factors affecting performance of fluoropolymer-based microporous layers, e.g., poly(tetrafluoroethylene)-based (hereinafter "PTFE-based") microporous layers, include fluoropolymer loading, thickness, and porosity.

According to the present disclosure, a slurry for fabricating improved microporous layers for use in cathode GDM's can be made by mixing electrically conductive particles or nanofibers, e.g., carbon particles such as Vulcan® XC-72R (Vulcan® is a registered trademark of Cabot Corp., Billerica, Mass.), isopropyl alcohol, Teflon® solution (Teflon® is a registered trademark of the E.I. DuPont de Nemours Co.), and deionized water. The slurry is coated onto the surface of a suitable support material, e.g., carbon paper or woven or non-woven cloth, etc. The amount of fluoropolymer (e.g., PTFE) loading, i.e., the dry weight of the fluoropolymer divided by the total dry weight of the constituents of the microporous layer, is a significant factor in providing a balance between several competing factors and obtaining good performance at low oxidant stoichiometries. Specifically, the inventors have determined that high fluoropolymer loading of the microporous layer of the cathode GDM advantageously increases water removal capability, thereby preventing cathode flooding, and provides fresh surfaces for facilitating transport of air/$O_2$ therethrough, but disadvantageously reduces the electrical conductivity of the electrode and increases the potential for catalyst flooding resulting from an increased amount of water forced back into the catalyst layer. On the other hand, too low fluoropolymer loading results in adverse effects on the above-enumerated cathode performance factors.

The thickness of the microporous layer of the cathode GDM (reflecting loading of the electrically conductive particles) is another significant factor in obtaining good electrode performance at low oxidant stoichiometries. For example, a too thin microporous layer does not provide adequate cathode function because a cathode GDL with no microporous layer, or a too thin microporous layer, is overly sensitive to liquid water accumulation; whereas, a too thick microporous layer increases resistance to air/$O_2$ transport therethrough.

Accordingly, the fluoropolymer loading and electrically conductive particle loading of the microporous layer of the cathode GDM should be within specific ranges for achieving good electrical performance at low oxidant stoichiometries below about 4 and as low as about 2.5. Specifically, fluoropolymer loading (e.g., PTFE loading) of the microporous layer of the cathode GDM should be in the range between about 10 and about 60 wt. %, preferably within the range of about 30 and 40 wt. % and the carbon particle loading of the microporous layer of the cathode GDM should be between about 0.5 and about 5 mg/cm$^2$ for obtaining (or maintaining) good electrical performance (e.g., steady-state power density) at low air stoichiometries $\xi_c$ in the range from about 2.5 to about 4.

Figure 4:
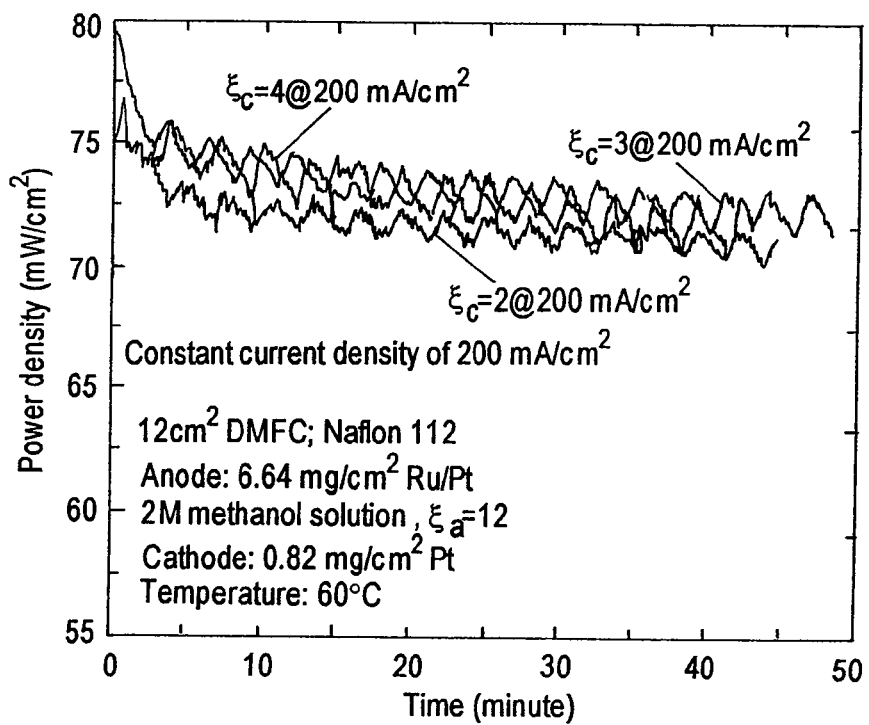
FIG. 4 is a graph for illustrating the steady-state performance of a DMFC with cathode electrodes comprising the improved gas diffusion layer (GDL) according to the present disclosure.

Referring to FIG. 4, shown therein is a graph illustrating the steady-state performance of DMFC's with MEA's comprising improved cathode electrodes with improved GDM's having PTFE-based microporous layers constituted according to the present disclosure. As is evident from FIG. 4, the steady-state performance exhibited by the DMFC's with improved cathode GDM's having microporous layers with PTFE loading and carbon loading within the above-described ranges is very good (i.e., steady-state power densities above about 70 mW/cm$^2$) at a number of very low oxidant stoichiometeries, i.e., when $\xi_c$=2, 3, and 4. Significantly, steady-state power output performance when $\xi_c$~2.5 remains comparable to performance at higher oxidant stoichiometries, and the ability to satisfactorily use oxidant stoichiometries $\xi_c$ not greater than about 2.5 advantageously facilitates operation with 20M methanol solution at a temperature of about 60° C., according to FIG. 3.

While PTFE is utilized as the fluoropolymer in the illustrated embodiment, the disclosure is not limited thereto and a number of other fluoropolymers may be utilized according to the principles of the present disclosure, including, for example: tetrafluoroethylene-hexafluoropropylene co-polymer ("FEP"), tetrafluoroethylene-alkylvinyl ether co-polymer ("PFA"), polychlorotrifluoroethylene ("PCTFE"), tetrafluoroethylene-ethylene co-polymer ("ETFE"), chlorotrifluoroethylene-ethylene co-polymer ("ECTFE"), and polyvinylidene fluoride ("PVDF"). Similarly, while carbon particles are utilized as the electrically conductive particles in the illustrated embodiment, the disclosure is not limited thereto and other electrically conductive particles may be utilized according to the principles of the present disclosure, including, for example, electrically conductive graphite fluoride particles or carbon nanofibers with appropriate F:C ratios.

In summary, the present disclosure describes improved cathode electrodes for use in DOFC/DMFC systems which facilitate operation at good power densities with highly concentrated fuel at low oxidant stoichiometries $\xi_c$. In addition, the disclosed methodology/technology can be practiced utilizing readily available materials.

In the previous description, numerous specific details are set forth, such as specific materials, structures, reactants, processes, etc., in order to provide a better understanding of the present disclosure. However, the present disclosure can be practiced without resorting to the details specifically set forth. In other instances, well-known processing materials and techniques have not been described in detsil in order not to unnecessarily obscure the present disclosure.

Only the preferred embodiments of the present disclosure and but a few examples of its versatility are shown and described in the present disclosure. It is to be understood that the present disclosure is capable of use in various other combinations and environments and is susceptible of changes and/or modifications within the scope of the disclosed concept as expressed herein.

What is claimed is:

1. A method of operating a direct oxidation fuel cell (DOFC) system, wherein the system comprises: (i) at least one membrane electrode assembly which includes a cathode, an anode and an electrolyte positioned therebetween, said cathode comprises, in direct overlying sequence, a catalyst layer, a microporous layer and a gas diffusion medium (GDM), wherein said microporous layer comprises an electrically conductive material and a fluoropolymer which is in a range about 10 wt. % to about 60 wt. %, wherein said microporous layer has a thickness ranging from about 10 to about 50 µm and an average pore size between about 10 and about 500 nm, and said GDM comprises a backing layer, and (ii) a liquid/gas separator, the method comprising:

supplying a concentrated solution of a liquid fuel to said anode and an oxidant to said cathode which produces water, wherein some of the produced water is transported to the liquid/gas separator and subsequently supplied to the anode; and operating said at least one membrane electrode assembly at a low oxidant stoichiometry ξc not greater than about 4; wherein $$\xi_c = \frac{0.42(\gamma + 2)}{3\eta_{fuel}} \frac{p}{p_{sat}}$$

and $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency.

2. The method according to claim 1, wherein:
said fluoropolymer comprises poly(tetrafluoroethylene) (PTFE).

3. The method according to claim 2, wherein:
said electrically conductive material comprises carbon particles or nanofibers.

4. The method according to claim 3, wherein:
loading of said carbon particles or nanofibers in said microporous layer is in the range from about 0.5 to about 5 mg/cm².

5. The method according to claim 1, wherein:
said backing layer comprises carbon paper or woven or non woven cloth having a porosity greater than about 70%.

6. The method according to claim 1, comprising operating said at least one membrane electrode assembly at a low oxidant stoichiometry ξc not greater than about 2.5.

7. The method according to claim 5, wherein:
said GDM has a fluropolymer loading in a range of from about 5 wt. % to about 30 wt. %.

8. The method according to claim 1, wherein:
said concentrated solution of liquid fuel is a solution of about 5 M to about 25 M methanol and said oxidant is air.

9. The method according to claim 8, comprising operating said at least one membrane electrode assembly at a low oxidant stoichiometry ξc not greater than about 2.5, a steady-state power density not less than about 70 mW/cm2, and a temperature of about 60°C.

10. A method of operating a direct oxidation fuel cell (DOFC) system, wherein the system comprises at least one membrane electrode assembly which includes a cathode, an anode and an electrolyte positioned therebetween, said cathode comprises, in direct overlying sequence, a catalyst layer, a microporous layer and a gas diffusion medium (GDM), said microporous layer comprises an electrically conductive material loaded in an amount from about 0.5 to about 5 mg/cm² and (b) a fluoropolymer loaded in a range from about 10 wt. % to about 60 wt. %, in the microporous layer, wherein said microporous layer has a thickness ranging from about 10 to about 50 μm and an average pore size between about 10 and about 500 nm, said GDM comprises a backing layer which includes carbon paper or woven or non-woven cloth having a porosity greater than about 70%, the method comprising:

supplying a concentrated solution of a liquid fuel to said anode and an oxidant to said cathode; and operating said at least one membrane electrode assembly at a low oxidant stoichiometry ξc not greater than about 8; wherein $$\xi_c = \frac{0.42(\gamma + 2)}{3\eta_{fuel}} \frac{p}{p_{sat}}$$

and $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency.

11. The method according to claim 10, comprising operating said at least one membrane electrode assembly at a low oxidant stoichiometry ξc of less than about 4.

12. The method according to claim 10, comprising operating said at least one membrane electrode assembly at a low oxidant stoichiometry ξc not greater than about 2.5

13. The method according to claim 10, wherein the system further comprises a liquid/gas separator for receiving water produced at the cathode and wherein at least some of the water produced at the cathode is subsequently supplied to the anode.

* * * * *